US 6,739,018 B1

(12) United States Patent
Jallet et al.

(10) Patent No.: US 6,739,018 B1
(45) Date of Patent: May 25, 2004

(54) WIPER ARM SHAPED AS AN AERODYNAMIC DEFLECTOR

(75) Inventors: Sebastien Jallet, Busset (FR); Jean-Michael Jarasson, Chelles (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/830,528

(22) PCT Filed: Oct. 27, 1999

(86) PCT No.: PCT/FR99/02619

§ 371 (c)(1),
(2), (4) Date: Apr. 26, 2001

(87) PCT Pub. No.: WO00/24615

PCT Pub. Date: May 4, 2000

(30) Foreign Application Priority Data

Oct. 28, 1998 (FR) .......................................... 98 13561

(51) Int. Cl.⁷ ................................................. B60S 1/34
(52) U.S. Cl. ................................ 15/250.201; 15/250.35
(58) Field of Search ..................... 15/250.351, 250.352, 15/250.201, 250.21, 250.23, 250.31

(56) References Cited

U.S. PATENT DOCUMENTS 5,495,637 A * 3/1996 Egner-Walter ......... 15/250.351
6,158,079 A * 12/2000 Shibata ................... 15/250.351

FOREIGN PATENT DOCUMENTS

| DE | 33 43 318 | | 6/1985 | |
|----|-----------|---|--------|---|
| DE | 3424729 | * | 2/1986 | ............ 15/250.201 |
| DE | 198 18 723 | | 10/1998 | |
| EP | 0 234 286 | | 9/1987 | |
| FR | 2632897 | | 12/1989 | |
| FR | 2660267 | * | 10/1991 | ............ 15/250.351 |
| FR | 2 747 975 | | 10/1997 | |
| GB | 2140287 | * | 11/1984 | ............ 15/250.351 |

* cited by examiner

Primary Examiner—Gary K. Graham
(74) Attorney, Agent, or Firm—J. Gordon Lewis

(57) ABSTRACT

The invention concerns a wiper arm comprising a body extending longitudinally from its rear driving end towards its front end which bears a wiper blade, and wherein, in cross section, at least a section of the arm body has an upturned U-shaped cross section defined by two wings mutually connected by an upper back and extending towards the surface to be wiped, consisting of a downstream wing remaining substantially perpendicular to the back and an inclined upstream wing forming an acute angle relative to a median plane parallel to the downstream wing to form an aerodynamic deflector integrated in the wiper arm which, by the action of a relative downwind direction, tends to urges the wiper arm towards the surface to be wiped. The upstream wing has a substantially planar or curved surface and the value of said angle ranges between 30° and 45°.

18 Claims, 2 Drawing Sheets

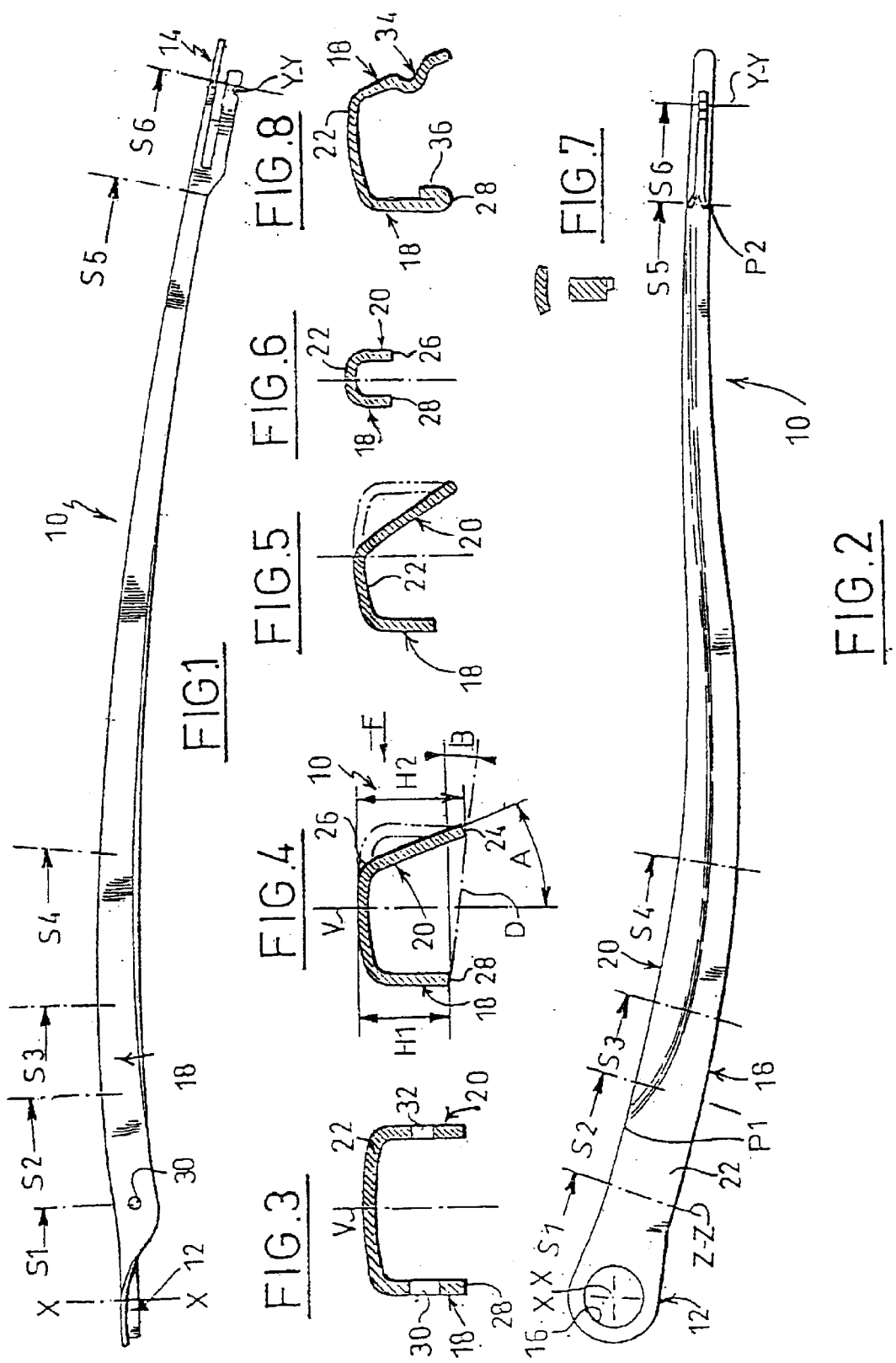

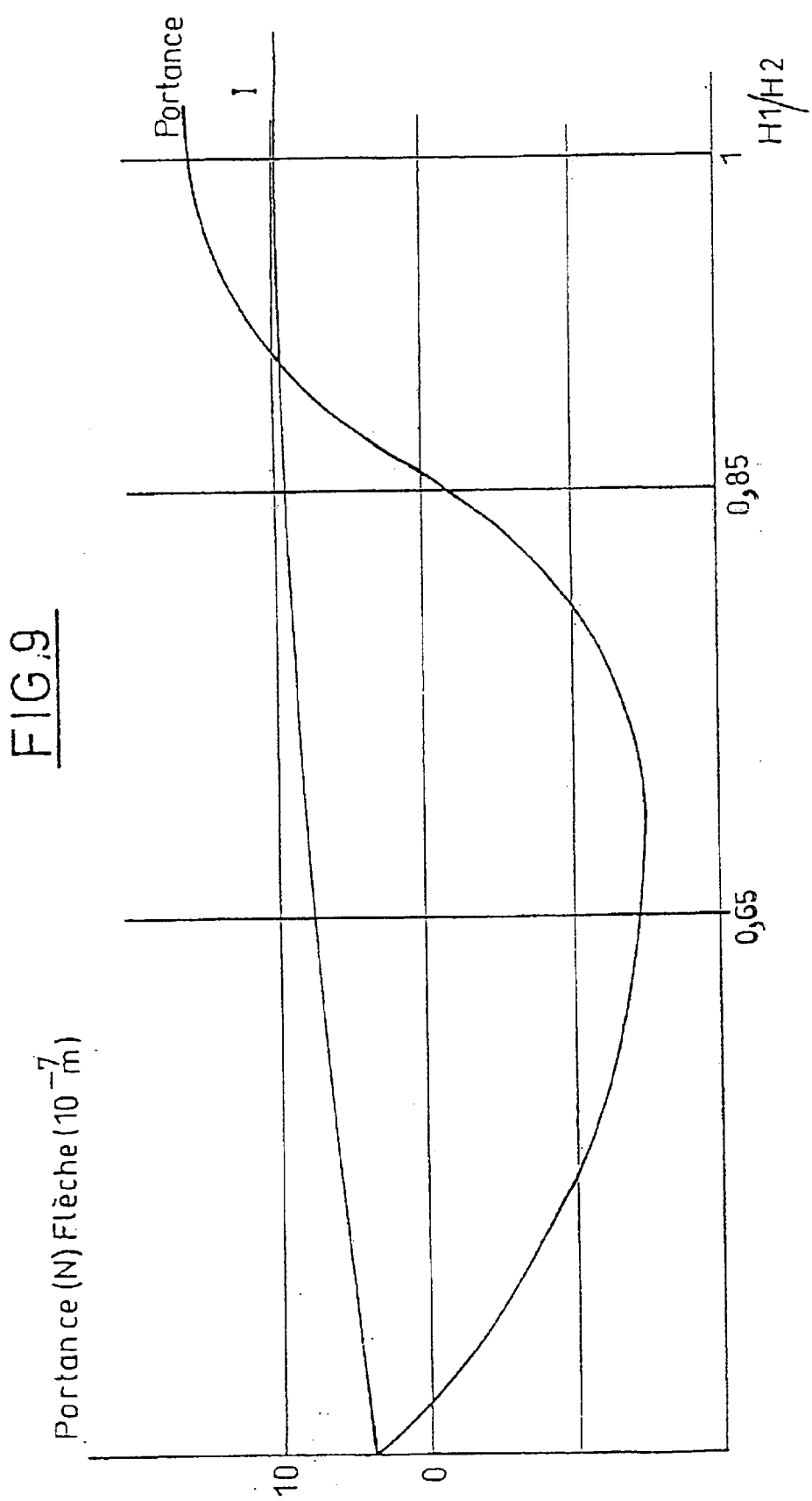

WIPER ARM SHAPED AS AN AERODYNAMIC DEFLECTOR

BACKGROUND

The present invention concerns a wiper arm for an automobile.

More specifically, the invention concerns a wiper arm of the type comprising a body extending longitudinally from its rear driving end towards its front end which bears a wiper blade, and wherein, in cross-section, at least a section of the arm body has an upturned U-shaped cross-section defined by two wings mutually connected by an upper back and extending towards the surface to be wiped, consisting of a downstream wing remaining substantially perpendicular to the back and an inclined upstream wing forming an acute angle relative to a median plan parallel to the downstreamwing to form an aerodynamic deflector integrated in the wiper arm which the action of a relative downwind direction, tends to urge the wiper arm towards the surface to be wiped.

An example of such a wiper arm is described and represented in document DE-A-3.343.318 in which the wiper arm is created from one piece in serrated, bent sheet metal. In the front portion of the aerodynamic deflector, the upstream wing is globally inclined and curved with its concavity oriented towards the flux of air corresponding to the relative wind direction applied to the wiper arm while wiping the windshield, by taking into account the forward movement of the vehicle.

The goal of this invention is to propose a wiper arm of this type which is created in order to improve the performance and rigidity, and to simplify its fabrication.

SUMMARY OF THE INVENTION

With this goal in mind, the invention proposes a wiper arm of the type mentioned above, characterized by the upstream wing presents a substantially curved surface, and the value of the acute angle of the inclined upstream wing ranges between 30° and 45°.

According to other characteristics of the invention:

- the value of the inclined acute angle ranges between 32° and 35°;
- the height of the downstream wing is below the height of the upstream wing, and the ratio of the two heights ranges between 0.65 and 0.85;
- in cross section the value of the angle between the straight line passing by the lower edges of the downstream and upstream wings and the tangent to the upper back at the level of the median plane ranges between 7° and 16°;
- at least one of the wings, notably the upstream wig, contains a longitudinal reinforcement rib;
- at least one of the wings, notably the downstream wing, contains an interior reinforcement fold;
- the acute inclined angle of the upstream wing varies progressively in a manner such that the two wings are parallel at the rear and front ends of the body of the wiper arm;
- the wiper arm is created in one piece of serrated and bent sheet metal.

BRIEF DESCRIPTION OF THE DRAWING

The other characteristics and advantages of the invention will appear in the reading of the detailed description which follows, for the comprehension of which one will refer to the attached drawings in which:

FIG. 1 is an elevated lateral view of a wiper arm that conforms to the specifications of the invention;

FIG. 2 is a top view of the wiper arm in FIG. 2;

FIGS. 3 to 7 are cross section views according to lines S1, S2, S3, S5 and S6 in FIGS. 1 and 2;

FIG. 8 is a view similar to FIG. 4 which illustrates a variation in production; and FIG. 9 is a diagram illustrating the relative dimensions of the wiper arm and the values of the aerodynamic lift and rigidity of the wiper arm.

DETAILED DESCRIPTION

In the description that is going to follow of an example of production, the terms "horizontal", "vertical", "upper", "lower", etc. will be used in a non-limiting fashion in order to facilitate the comprehension of the description and in reference to the Figs.

In this example, the upstream wing presents a flat surface. In other methods of realization, the upstream wing presents a surface having, in cross-section, a curve, specifically a weak curve, this curve being able to vary from one end to the other of the wiper arm.

A wiper arm 10 is represented on FIGS. 1 to 7 is realized in the shape of only one piece of serrated and bent sheet metal.

The wiper arm 10 extends longitudinally from its rear end 12 to its front end 14.

The rear end 12 is created in order to allow the driving of the wiper arm around a vertical driving X—X axis and contains, for this effect, an aperture 16 allowing the passage of the upper free end (not represented) by a drive shaft for alternating or linear sweeping of the windshield.

The front longitudinal end 14 is formed in order to make up an articulation end for a wiper arm (not represented) that is mounted for pivoting globally around a horizontal axis Y—Y.

According to a generally known method of conception, the wiper arm 10 presents an upturned U-shaped cross-section.

Thus, it contains two vertical and parallel lateral wings 18 and 20 (see FIG. 3) that are linked between them by a horizontal upper back 22 which has a slightly curved profile with its convexity oriented vertically towards the top. The wing reach from the upper back 22 in the direction of the surface to be wiped (not, represented).

In relation to the flux of air F (see FIG. 4) that corresponds to the principal direction of the vent relative to which the wiper arm is submissive while the wiping movement and the forward movement of the vehicle, one distinguishes the downstream wing 18 and the upstream wing 20.

As one can see by considering FIG. 2, the wiper arm 10 is not rectilinear, but it presents a generally curved shape.

In all of the transversal sections of the arm, the downstream wing 18 is notably flat and vertical.

Leaving from the rear longitudinal end 12 of the wiper arm 10, to the left in consideration of FIGS. 1 and 2, one notices that the upstream wing 20 is also notably flat and vertical, that is to say, parallel to the downstream wing 18 until one point P1, situated between sections S1 and S2, from which the upstream wing 20 is flat but is inclined in relation to a vertical median plane V, parallel to the downstream wing 18, by forming an acute angle A in relation to this plane, the inclination being such that the lower side 24 of the upstream wing 20 is more spread out from the vertical median plane V than its upper edge 28.

In addition, from the point P1, the lower edge 24 of the upstream wing 20 is situated vertically lower than the edge 28 of the downstream wing 18 while, until the point P1, the upstream 20 and the downstream wings 18 have the same height.

As on moves along the wiper arm from the rear to the front from point P1, one reaches the point P2 situated notably to the right of section S5 from which, as one can see in FIG. 6, the upstream 20 and downstream 18 wings, are once again planar, vertical, and parallel to each other and of equal heights.

Near the rear end 12, the downstream 18 and upstream 20 wings each contain a hole 30, 32 aligned transversally in the plane of section S1 for the passage of an articulation rod on the axis Z—Z notably horizontal and perpendicular to the axis X—X.

From the point P2, and thus from the plane of section S5, the arm extends longitudinally towards the front from its front end formed as illustrated in FIG. 7 with the lateral downstream 18 and upstream 20 wings that are once again connected from the vertical median plane of this end front portion in two central adjacent wings.

Conforming to one of the characteristics of the invention, the value of the acute angle A of the inclination of the upstream wing 20 varies the length of the wiper arm 10.

More precisely, it is equal to approximately 23° to the right of section S2 (see FIG. 4), then it augments in order to be at its maximum between section S3 and S4.

In effect, the longitudinal portion of the wiper arm between sections S3 and S4 make up the principal section forming an aerodynamic deflector for which the aerodynamic global lift applies to the wiper arm 10 is negative, the value of angle A ranging between 30° and 45°, and preferably between 32° and 35°, for the length of the portion.

The value of the angle A decreases progressively towards the front end from section S4 in order to be brought back to 0° to the right of section S5.

Conforming to another characteristic of the invention, the ratio between the height H1 of the downstream wing 18 and the height H2 of the upstream wing 20, while this latter is inclined, ranging between 0.65 and 0.85.

In the same manner, the acute angle B, formed by the straight line D, passes by the lower sides 28 and 24 of the downstream wing 18 and the upstream wing 20, in relation to the horizontal passing by the lower edge 28, ranges between 7° and 16° for the length of the section forming the aerodynamic deflector.

The choice of these parameters of such sizes allows, in the zone corresponding to the situation in which the aerodynamic lift is negative, that is to say, while the wiper arm is pressed vertically against the windshield and while it does not lift under the flux of air, in order to not reduce by too much the moment of bending 1 of the arm in this zone, the moment of bending 1 being reduced to the maximum of 30% in relation to its maximum value marked 10 being displayed on the diagram of FIG. 9.

In this zone, in which the ratio of the heights ranges between 0.65 and 0.85, there is not any twisting in the successive transversal sections of the working arm.

Thanks to the specifications of the invention, one thus obtains an optimal compromise between the reduction of the twisted aerodynamic (drag, but above all lift) and the increase in the rigidity of a wiper arm created in just one piece.

In order to further increase this rigidity, it is possible (see FIG. 8) to form a longitudinal rib 34 at least in the upstream wing 20 and to reinforce the downstream wing 18 by an interior fold 36 of the sheet metal from the lower edge 28 and vertically towards the top.

What is claimed is:

1. A wiper arm of the type containing an arm body that extends longitudinally from a rear driving end towards a front end that bears a wiper blade, and of the type in which, in cross section, at least a section of the arm body has an upturned U-shaped cross-section defined by upstream and downstream wings mutually connected by an upper back, both wings extending towards a surface to be wiped, the downstream wing remaining substantially perpendicular to the upper back and the upstream wing forming an acute angle relative to a median plane parallel to the downstream wing to form an aerodynamic deflector integrated in the wiper arm which, an action of a relative downwind direction, tends to urge the wiper arm towards the surface to be wiped, characterized by the upstream wing presenting a surface, a curve of which varies progressively from one end to the other of the wiper arm body, and of which the value of the acute angle ranges between 30° and 45°.

2. The wiper arm according to claim 1, characterized by the upstream wing.

3. The wiper arm according to claim 1, characterized by the value of the acute angle ranging between 32° and 35°.

4. The wiper arm according to claim 1, characterized by a height of the downstream wing being lower than a height of the upstream wing, and that the ratio of the two heights ranges between 0.65 and 0.85.

5. The wiper arm according to claim 1, characterized by, in cross-section, the value of an angle between a straight line passing by lower edges of the downstream and upstream wings and the tangent to the upper back at the level of the median plane, ranging between 70° and 16°.

6. The wiper arm according to claim 1, characterized by at least one of the upstream and downstream wings containing a longitudinal reinforcement rib.

7. The wiper arm according to claim 1, characterized by at least one of the upstream and downstream wings, containing an interior reinforcement fold.

8. The wiper arm according to claim 1, characterized by the inclined acute angle of the upstream wing varying progressively in such a way that the two wings are parallel at the rear and front ends of the wiper arm body.

9. The wiper arm according to claim 1, characterized by being produced in one piece of serrated, bent sheet metal.

10. A wiper arm comprising:
    an arm body extending longitudinally from a rear driving end towards a front end, the arm body having at least a portion with a U-shaped cross-section defined by an upstream wing and a downstream wing mutually connected by an upper back, both wings extending toward a surface to be wiped, the downstream wing remaining substantially perpendicular to the upper back and the upstream wing inclined forming an acute angle relative to a median plane extending parallel to the downstream wing to form an aerodynamic deflector integrated in the arm body, such that a relative wind flow across the aerodynamic deflector tends to urge the arm body toward the surface to be wiped, the upstream wing presenting a surface, a curve of the surface varing progressively from the rear end to the front end of the arm body, and a value of the acute angle ranging between 30° and 45°, inclusive.

11. The wiper arm of claim 10 further comprising the upstream wing.

12. The wiper arm of claim 10 further comprising the value of the acute angle ranging between 32° and 35°, inclusive.

13. The wiper arm of claim 10 further comprising a height of the downstream wing being lower than a height of the upstream wing, and the ratio of the two heights ranges between 0.65 and 0.85, inclusive.

14. The wiper arm of claim 10 further comprising in cross-section, the value of an angle between a straight line passing by lower edges of the downstream and upstream wings and a tangent to the upper back at the level of the median plane ranging between 7° and 16°, inclusive.

15. The wiper arm of claim 10 further comprising at least one of the upstream and downstream wings containing a longitudinal reinforcement rib.

16. The wiper arm of claim 10 further comprising at least one of the upstream and downstream wings containing an interior reinforcement fold.

17. The wiper arm of claim 10 further comprising the acute angle of the upstream wing varying progressively in such a way that the upstream and downstream wings are parallel at the rear end and the front end of the arm body.

18. The wiper arm of claim 10 further comprising the arm body produced in one piece of serrated, bent sheet metal.

* * * * *